United States Patent
Tada

(10) Patent No.: US 7,020,467 B2
(45) Date of Patent: Mar. 28, 2006

(54) COMMUNICATION APPARATUS AND CONTROL METHOD THEREFOR

(75) Inventor: Masahiro Tada, Akishima (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 812 days.

(21) Appl. No.: 09/748,263

(22) Filed: Dec. 27, 2000

(65) Prior Publication Data

US 2001/0019956 A1 Sep. 6, 2001

(30) Foreign Application Priority Data

Dec. 28, 1999 (JP) ............................. 11-373073

(51) Int. Cl.
*H04Q 7/20* (2006.01)

(52) U.S. Cl. .................. 455/434; 455/572; 455/573; 455/574

(58) Field of Classification Search ................ 455/434, 455/450, 574, 422.1
See application file for complete search history.

(56) References Cited

U.S. PATENT DOCUMENTS

| | | |
|---|---|---|
| 5,241,691 A | 8/1993 | Owen |
| 5,301,225 A | 4/1994 | Suzuki et al. ............... 379/59 |
| 5,382,949 A | 1/1995 | Mock et al. |
| 5,574,996 A | 11/1996 | Raith |
| 5,621,732 A * | 4/1997 | Osawa ......................... 370/79 |
| 5,627,882 A | 5/1997 | Chien et al. ................. 379/61 |
| 6,009,325 A * | 12/1999 | Retzer et al. ............... 455/434 |
| 6,366,792 B1 * | 4/2002 | Katsuki ..................... 455/572 |

FOREIGN PATENT DOCUMENTS

| | | |
|---|---|---|
| EP | 0 711 089 A2 | 5/1996 |
| GB | 2 328 588 A | 2/1999 |
| JP | 2-14631 | 1/1990 |
| JP | 8-508629 | 9/1996 |
| JP | 11-46162 | 2/1999 |
| WO | WO 98/27769 | 6/1998 |
| WO | WO 99/22352 | 5/1999 |

OTHER PUBLICATIONS

Bluetooth Specification Version 1.0 B, Nov. 29, 1999, Channel Control, pp. 108–130.

"IrLAP Description of Procedures", Infrared Data Association Serial Infrared Link Access Protocol (IrLAP), Version 1.1, pp. 34–92, (Jun. 16, 1996).

* cited by examiner

*Primary Examiner*—Temica Beamer
(74) *Attorney, Agent, or Firm*—Finnegan, Henderson, Farabow, Garrett & Dunner, L.L.P.

(57) ABSTRACT

A data traffic is monitored, and the current traffic state is checked. If the traffic exceeds a threshold a, the time interval of Inquiry Scan is set to a maximum value X1 to prevent communication performance from deteriorating due to Inquiry Scan. Likewise, if the traffic falls in the range of the threshold a to a threshold b, the time interval of Inquiry Scan is set to an intermediate value X2. If the traffic amount is equal to or less than the threshold b, the time interval of Inquiry Scan is set to a minimum value X3.

10 Claims, 9 Drawing Sheets

COMMUNICATION APPARATUS AND CONTROL METHOD THEREFOR

CROSS-REFERENCE TO RELATED APPLICATIONS

This application is based upon and claims the benefit of priority from the prior Japanese Patent Application No. 11-373073, filed Dec. 28, 1999, the entire contents of which are incorporated herein by reference.

BACKGROUND OF THE INVENTION

The present invention relates to a communication apparatus and a control method therefor and, more particularly, to a communication apparatus in which a communication channel and a control channel are exclusively assigned to a radio communication resource to be used, and a control method therefor.

Conventionally, in information processing apparatuses such as personal computers (PCs) and personal digital assistants (PDA), communication interfaces using infrared rays are used. According to IrDA as infrared communication standards, a search for a terminal in a communication zone is made every predetermined time interval before establishment of communication regardless of the state of the information processing apparatus. The time interval at which this terminal search is made is determined in advance, and a message for a terminal search is always broadcast every predetermined time interval even if the battery residual capacity becomes small.

Since a terminal as a communication partner is not always present in a communication zone, even if terminal search processing is indiscriminately performed every predetermined time interval, the communication partner may not be searched out. In this case, power is unnecessarily consumed. In a device that operates on a battery, in particular, if terminal search processing is indiscriminately performed every predetermined time interval, the battery driving time shortens accordingly.

In radio communication systems such as Bluetooth and HomeRF systems, which have recently received a great deal of attention, terminal search processing is generally performed every predetermined time interval. In these radio communication systems, a master can simultaneously connect to a plurality of slaves. For this reason, unlike IrDA, even if connection is being established, terminal search processing is periodically performed to search for a new terminal. In this case, since a communication channel for data transmission/reception and a control channel for terminal search processing or the like are exclusively assigned to a radio communication resource, if communication is being performed in performing terminal search processing, the communication is temporarily stopped. If, therefore, a terminal as a communication partner is not present in a communication zone, wasteful terminal search processing decreases the communication speed.

As described above, in the prior art, terminal search processing is performed every predetermined time interval, resulting in unnecessary consumption of power and a deterioration in communication processing performance.

BRIEF SUMMARY OF THE INVENTION

Accordingly, it is an object of the present invention to provide a communication apparatus capable of improving communication performance and suppressing power consumption by dynamically optimizing parameters associated with connection control, and a control method therefor.

According to one aspect of the present invention, there is provided a communication apparatus in which a communication channel and a control channel are exclusively assigned to a radio communication resource to be used, the apparatus comprising: means for executing data transmission/reception using the communication channel; means for executing a control procedure required for establishment of a radio link using the control channel; means for monitoring a traffic of the communication channel; and means for dynamically controlling an execution timing or execution time interval of the control procedure on the basis of the traffic detected by the monitoring means.

According to another aspect of the present invention, there is provided a communication apparatus in which a communication channel and a control channel are exclusively assigned to a radio communication resource to be used, the apparatus comprising: means for executing data transmission/reception using the communication channel; means for executing a control procedure required for establishment of a radio link using the control channel; user interface means for setting preferentiality related to one of the data transmission/reception and the control procedure in accordance with a user operation; and means for controlling an execution timing or execution time interval of the control procedure on the basis of a setting result of the user interface means.

According to still another aspect of the present invention, there is provided a communication apparatus capable of being driven by a battery and simultaneously connecting to a plurality of remote terminals, the apparatus comprising: means for periodically executing transmission processing of a terminal search message for searching for a remote terminal or terminal search wait processing for detecting the terminal search message and responding thereto; means for detecting a residual capacity of the battery; and means for dynamically controlling an execution timing or executing time interval of the transmission processing of the terminal search message or the terminal search wait processing on the basis of a detection result of the detection means.

According to still another aspect of the present invention, there is provided a control method for a communication apparatus in which a communication channel and a control channel are exclusively assigned to a radio communication resource to be used, the method comprising the steps of: executing data transmission/reception using the communication channel and executing a control procedure required for establishment of a radio link using the control channel; monitoring a traffic of the communication channel; and dynamically controlling an execution timing or execution time interval of the control procedure on the basis of the traffic detected in the monitoring step.

According to still another aspect of the present invention, there is provided a control method for a communication apparatus in which a communication channel and a control channel are exclusively assigned to a radio communication resource to be used, the method comprising the steps of: executing data transmission/reception using the communication channel and executing a control procedure required for establishment of a radio link using the control channel; setting preferentiality related to one of the data transmission/ reception and the control procedure in accordance with a user operation; and controlling an execution timing or execution time interval of the control procedure on the basis of a setting result in the setting step.

According to still another aspect of the present invention, there is provided a control method for a communication apparatus capable of being driven by a battery and simultaneously connecting to a plurality of remote terminals, the method comprising the steps of: detecting a residual capacity of the battery; and dynamically controlling an execution timing or execution time interval of transmission processing of a terminal search message for searching for a remote terminal or terminal search wait processing for detecting the terminal search message and responding to the message on the basis of a detection result in the detecting step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the views of the accompanying drawing.

Figure 1:
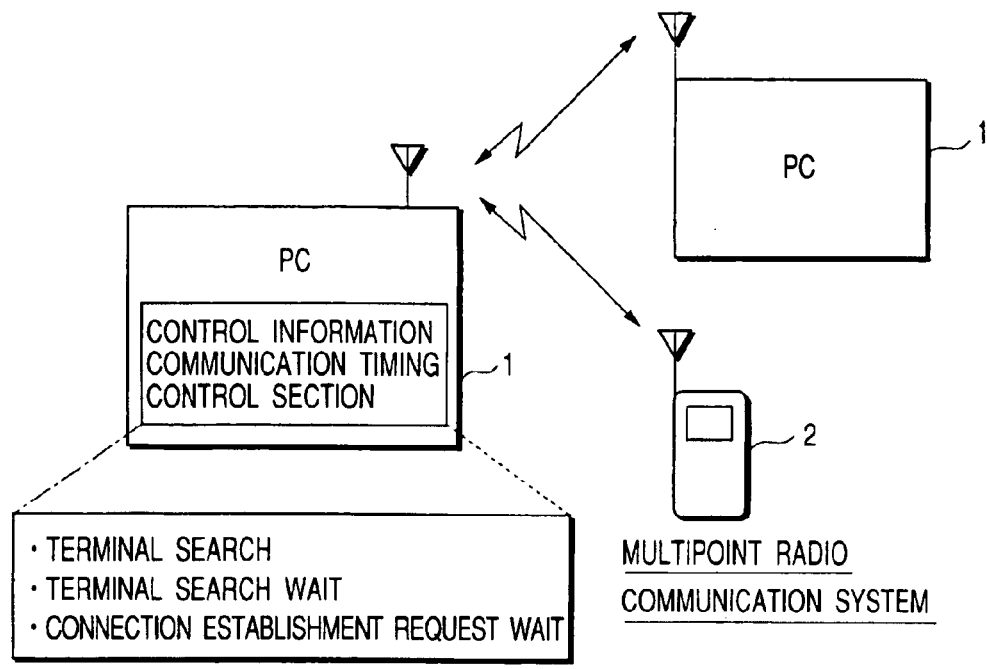
FIG. 1 is a view showing the basic arrangement of a radio communication system according to an embodiment of the present invention.

FIG. 1 conceptually shows the basic arrangement of a radio communication system according to an embodiment of the present invention.

In the embodiment, there is provided a communication apparatus (information processing apparatus 1) in which a communication channel and a control channel are exclusively assigned to a radio communication resource to be used. The apparatus includes a unit for executing data transmission/reception using the communication channel and a unit for executing a control procedure required for establishment of a radio link using the control channel.

The information processing apparatus 1 is, for example, a notebook type personal computer (to be referred to as a PC hereinafter) that can be driven on a battery, and can communicate with a portable device such as a portable telephone 2 by establishing a local link thereto by radio. In a state where this radio link is established, a user can, for example, remotely control the PC 1 by using the portable telephone 2 and exchange data such as mail and personal information with the PC 1 and the portable telephone 2.

The PC 1 can be simultaneously connected to a plurality of remote terminals, e.g., the portable telephone 2 and another PC (multipoint). In this case, even while connection is being established, the PC 1 can enter a terminal search mode of searching for a new terminal and can also enter a connection establishment request wait mode, which dynamically allows a new terminal to join the network.

In the terminal search mode, a search is made for a terminal that is preset in a range (communication zone) where radio waves can reach, and processing for the acquisition of information necessary for connection is performed. In this terminal search mode, a terminal search message is broadcast. In the terminal search wait mode, the terminal search message transmitted from a remote terminal to search for a terminal is detected, and processing for transmitting a message responding to the detected message is performed. In this connection establishment request wait mode, the connection establishment request message transmitted from the remote terminal is detected, and processing for the establishment of connection in response to the detected message is performed.

A message in a control procedure (terminal search, terminal search wait, and connection establishment request wait) required for new radio link establishment is exchanged by using a control channel. Since a radio communication resource is exclusively used between this control channel and a communication channel for data transmission/reception, if communication is being performed in making a terminal search or the like, the communication (communication mode) is temporarily stopped. This embodiment has a control information communication timing control section for dynamically controlling the timing at which a control procedure (terminal search, terminal search wait, and connection establishment request wait) necessary for the establishment of a new radio link is executed and the time interval of the control procedure in accordance with the traffic state of a communication channel, the current power supply state, and the like. With this control section, parameters associated with connection control can be optimized.

Figure 2:
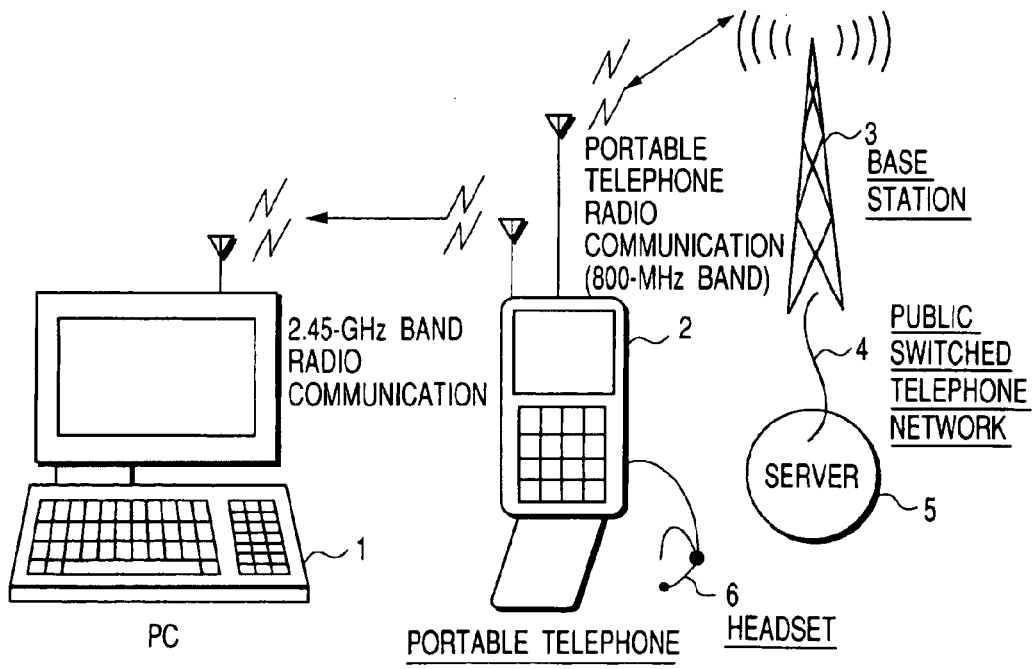
FIG. 2 is a view for briefly explaining the overall radio communication system according to the embodiment.

The overall radio communication system of this embodiment will be briefly described next with reference to FIG. 2.

The portable telephone 2 transmits/receives speech or data to/from base stations 3 for portable telephones, which are installed in various areas, by using radio waves in the 800-MHz band. The base station 3 encompasses a predetermined radio area, in which communication with the portable telephone 2 is implemented. A server 5 is connected to the base station 3 through a public switched telephone network 4. The user of the portable telephone 2 can also perform speech communication by using a headset 6.

This portable telephone 2 has a radio communication interface for transmitting/receiving radio waves in the 2.45-GHz band to/from the PC 1, in addition to a radio communication interface for transmitting/receiving radio waves in the 800-MHZ band to/from the base station 3. The portable telephone 2 also has an LCD for displaying data, a key operation portion for inputting data, and the like.

The PC 1 and portable telephone 2 are connected to each other through radio waves in a specific frequency band which are different from the radio waves used in the portable telephone system. More specifically, a 2.45-GHz band Bluetooth system is used. The Bluetooth system is a short-range radio communication standard, and implements radio communication within about 10 m by using radio waves in the 2.45-GHz band.

The PC 1 includes an antenna portion for transmitting/receiving radio waves in the 2.45-GHz band to/from the portable telephone 2, an LCD used as a display monitor, a keyboard for inputting data, and the like.

The hardware and software arrangements of the PC 1 and portable telephone 2 will be described below separately.
(Arrangement of Personal Computer)

Figure 3:
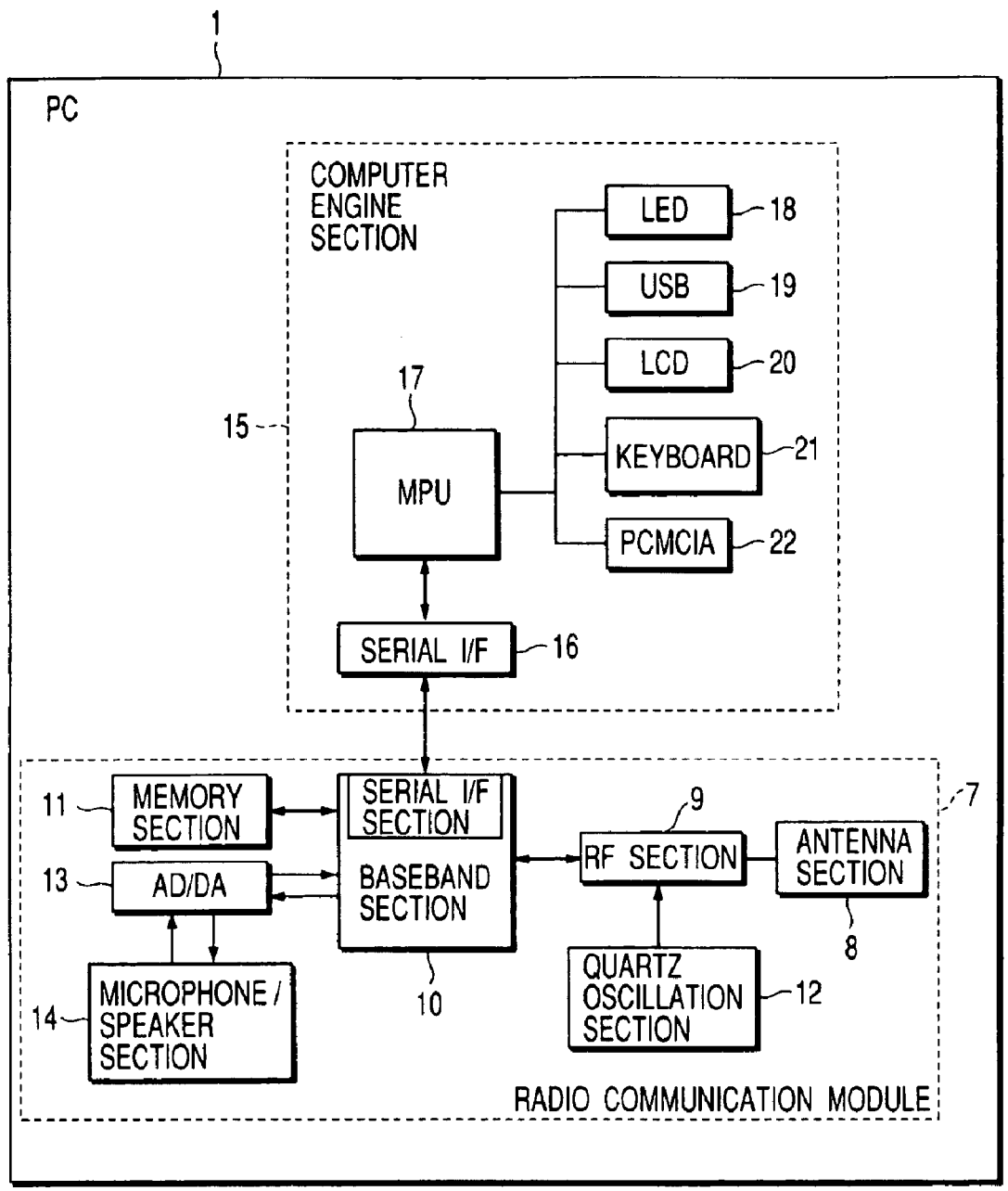
FIG. 3 is a block diagram showing the hardware arrangement of a personal computer used as an information processing apparatus in the system according to the embodiment.

FIG. 3 is a block diagram showing the hardware arrangement of the PC 1. The hardware portion required to implement this system will be mainly described below.

The PC 1 incorporates a radio communication module 7 for communicating with the portable telephone 2 by using radio waves in the 2.45-GHz band. The radio communication module 7 includes an antenna section 8, an RF (Radio Frequency) section 9, a baseband section 10, a memory section 11, a quartz oscillation section 12, an AD/DA conversion section 13, and a microphone/speaker section 14. A similar radio communication module is also incorporated in the portable telephone 2. The radio communication module 7 is connected to a computer engine section 15 as a main unit of the personal computer through a serial interface 16 such as a USB.

The antenna section 8 is a section that implements radio communication with the portable telephone 2 and transmits/receives radio waves in the 2.45-GHz band. In the reception mode, the RF section 9 mixes the radio wave received through the antenna section 8 with a fundamental frequency signal oscillated by the quartz oscillation section 12 to convert the radio wave into an intermediate frequency signal, and then demodulates it into a digital signal that can be processed by the baseband section 10. The baseband section 10 performs protocol processing. The signal input through the antenna section 8 and RF section 9 is converted into a data string that can be processed by the CPU in the baseband section 10.

In the transmission mode, in a reverse procedure to that in the reception mode, the baseband section 10 converts transmission data into a signal that can be processed by the RF section 9 in accordance with a predetermined protocol, and the RF section 9 modulates the signal into a radio wave in the 2.45-GHz band, thereby transmitting it from the antenna section 8.

The microphone/speaker section 14 is a device for inputting/outputting speech signals, and is connected to the baseband section 10 through the AD/DA conversion section 13.

The computer engine section 15 has an MPU (computer engine) 17 including a CPU, memory, and peripheral control circuits, an LED (Light Emitting Diode) 18 for performing alarm display and the like, a USB interface 19 for connecting a peripheral device based on USB (Universal Serial Bus) standards, an LCD (Liquid Crystal Display) 20 used as a display monitor, a keyboard 21 for data input, PCMCIA (Personal Computer Memory Card International Association) interface 22 for mounting a PC card, and the like.

Figure 4:
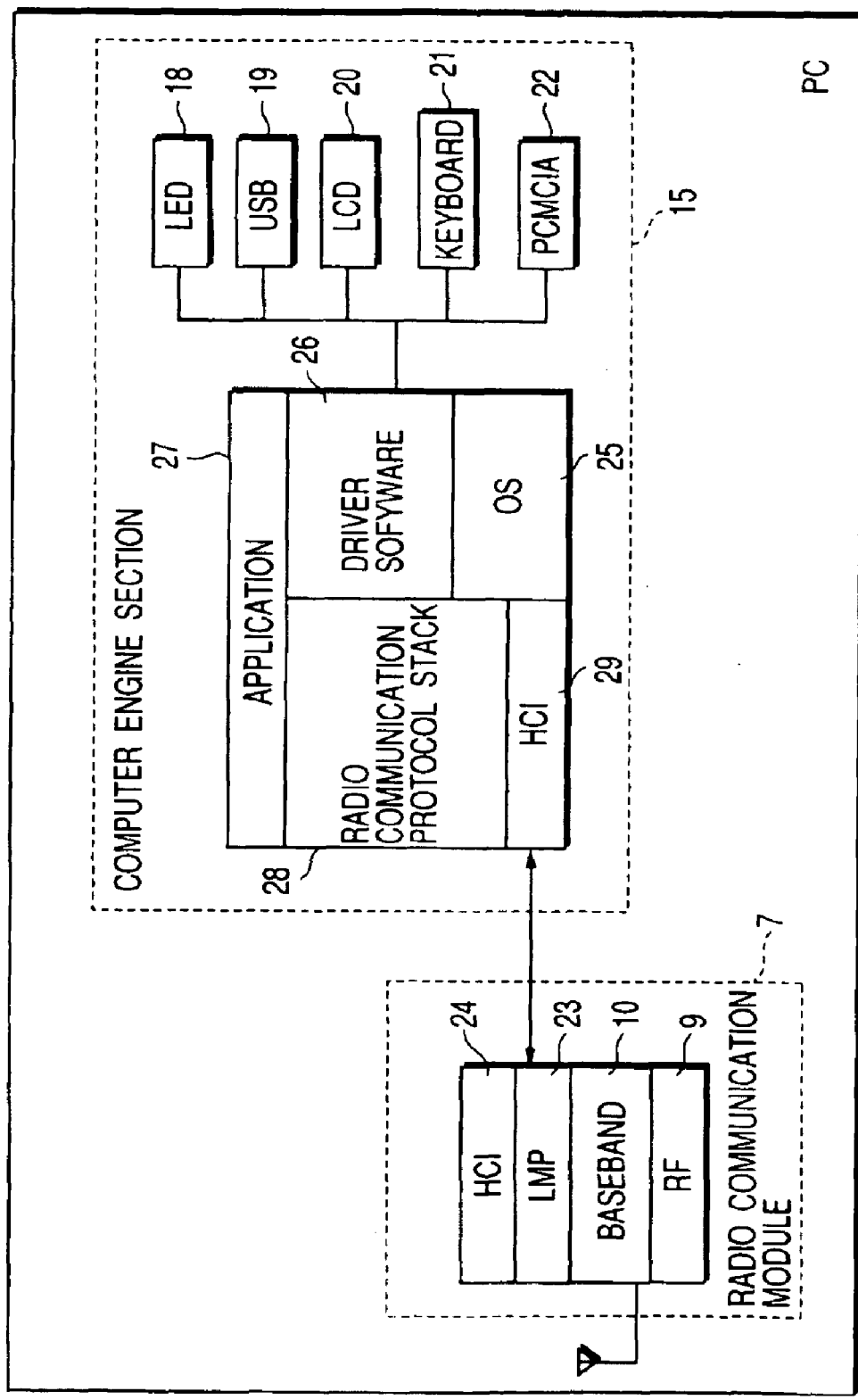
FIG. 4 is a block diagram showing the software arrangement of a personal computer used in the system according to the embodiment.

FIG. 4 is a block diagram showing the software arrangement of the PC 1. FIG. 4 shows the structure of the PC 1 incorporating a radio communication protocol stack for 2.4-GHz band radio communication on the computer engine section 15 side.

On the radio communication module 7 side of the PC 1, as shown in FIG. 4, the RF section 9 and baseband section 10, which are hardware, are provided, and an LMP (Link Management Protocol) 23 for controlling a radio link with the radio communication apparatus on the portable telephone 2 side by radio waves and an HCI (Host Control Interface) 24 for performing serial interface processing for the computer engine section 15 are incorporated in the baseband section 10.

The computer engine section 15 incorporates a 2.45-GHz band radio communication protocol stack 28, an HCI 29 for performing serial interface processing on the radio communication module 7 side, and the like, in addition to an OS (Operating System) 25, drive software 26 for controlling various peripheral devices, and various applications 27 such as wordprocessor software, spreadsheet software, electronic mail software, and system software for implementing a remote control function, which are incorporated as standard software for the PC.
(Arrangement of Portable Telephone)

Figure 5:
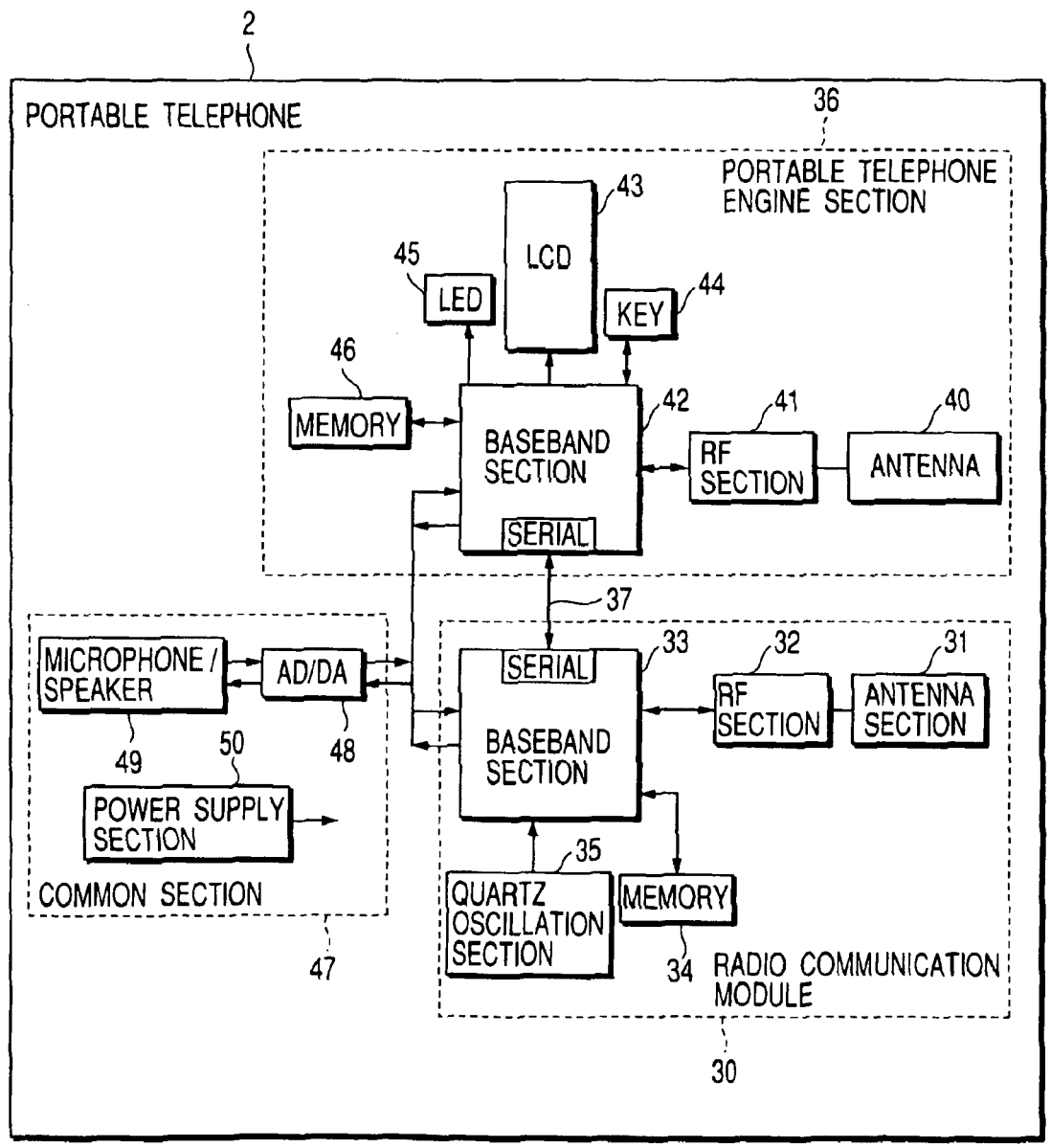
FIG. 5 is a block diagram showing the hardware arrangement of a portable telephone used in the system according to the embodiment.

FIG. 5 is a block diagram showing the hardware arrangement of the portable telephone 2. The hardware portion required to implement this system will be mainly described.

As a radio communication module 30 for communicating with the PC 1 by using radio waves in the 2.45-GHz band, an antenna section 31, RF section 32, baseband section 33, memory section 34, and quartz oscillation section 35 are incorporated in the portable telephone 2. The radio communication module 30 and a portable telephone engine section 36 are connected to each other through a serial interface 37.

The antenna section 31 is a section for transmitting/receiving radio waves in the 2.45-GHz band to implement radio communication with the PC 1. In the reception mode, the RF section 32 mixes the radio wave received through the antenna section 31 with a fundamental frequency signal oscillated by the quartz oscillation section 35 to convert the radio wave into an intermediate frequency signal, and then demodulates it into a digital signal that can be processed by the baseband section 33. The baseband section 33 performs protocol processing. The signal input through the antenna section 31 and RF section 32 is converted into a data string that can be processed by the CPU in the baseband section 33.

In the transmission mode, in a reverse procedure to that in the reception mode, the baseband section 33 converts transmission data into a signal that can be processed by the RF section 32 in accordance with a predetermined protocol, and the RF section 32 modulates the signal into a radio wave in the 2.45-GHz band, thereby transmitting it from the antenna section 31.

The portable telephone engine section 36 includes an LCD 43 for data display, a key operation section 44 for data input, an LED 45 for alarm display and the like, a memory 46 for data storage, and the like, in addition to an antenna 40 for a portable telephone, an RF section 41, and a baseband section 42.

As a common section 47, an AD/DA conversion section 48, microphone/speaker 49, and power supply section 50 are provided.

Figure 6:
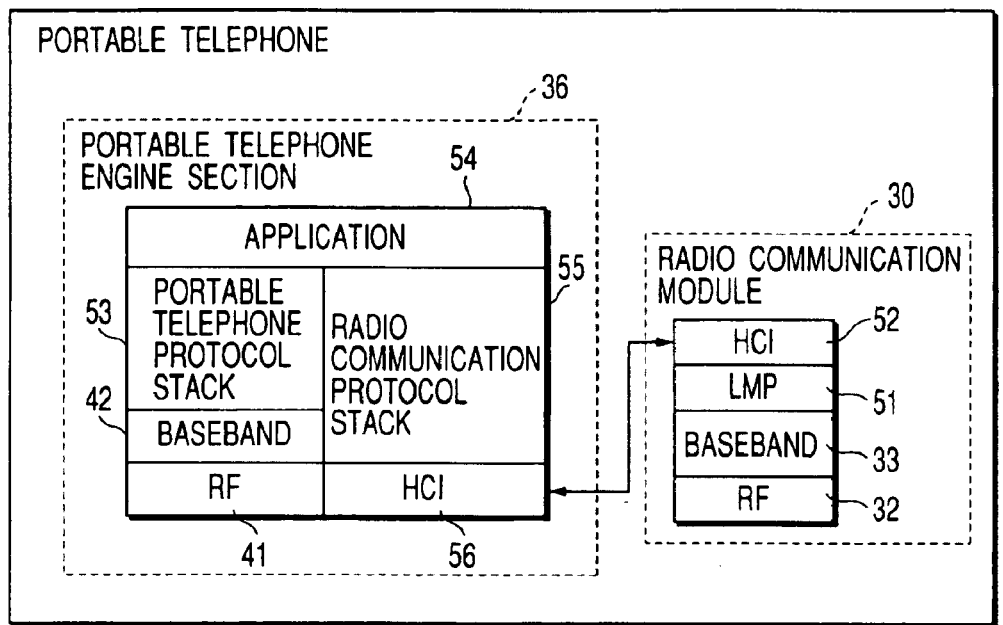
FIG. 6 is a block diagram showing the software arrangement of a portable telephone used in the system according to the embodiment.

FIG. 6 is a block diagram showing the software arrangement of the portable telephone 2. FIG. 6 shows the structure of the portable telephone 2 in which a radio communication protocol stack for 2.45-GHz band radio communication is mounted on the portable telephone engine section 36 side.

As shown in FIG. 6, the RF section 32 and baseband section 33, which are hardware, are arranged on the radio communication module 30 side of the portable telephone 2. An LMP (Link Management Protocol) 51 for controlling a radio link to the radio communication apparatus on the PC 1 side by radio waves and an HCI (Host Control Interface) 52 for performing serial interface processing for the portable telephone engine section 36 are mounted in the baseband section 33.

In addition to the RF section 41, the baseband section 42, and a portable telephone protocol stack 53, which are mounted as standard equipment for a portable telephone, the portable telephone engine section 36 incorporates an application 54 including system software and the like for implementing a remote control function, a radio communication protocol stack 55 for 2.45-GHz radio communication, and an HCI 56 for performing serial interface processing for the radio communication module 30 side.

(Optimization of Parameters for Connection Control)

Parameter optimization processing which is a feature of this embodiment will be described by exemplifying the case wherein the Bluetooth technique as a 2.45-GHz band radio communication standard is used. Bluetooth specifications will be briefly described first.

The Bluetooth system uses a frequency hopping technique of performing packet transmission of data by TDD (Time Division Duplex) with one slot corresponding to 625 μs and a change in frequency in units of packets. By using the same frequency hopping sequence, a radio network called a piconet is formed between one master and a maximum of seven slaves to perform communication. Data channels (communication channels) include two types of channels, namely an asynchronous data channel (ACL) and synchronous speech channel (SCO). Data can be transmitted through one SCO at 64 kbps, and three SCOs can be simultaneously used.

According to the Bluetooth technique, if a terminal that wants to perform communication does not know the address of a remote terminal, Inquiry is executed to acquire information necessary for connection establishment (terminal search processing). This makes it possible to acquire the device addresses and clock information of all terminals that respond to the Inquiry. By using these pieces of information, connection can be actually established in the subsequent processing termed Page (connection establishment request processing). A given terminal that permits another terminal to search out (find) the given terminal itself performs Inquiry Scan (terminal search wait processing) to respond to an Inquiry message. A terminal in a connection establishment request wait state performs Page Scan (connection establishment request wait processing) to respond to Page.

Figure 7:
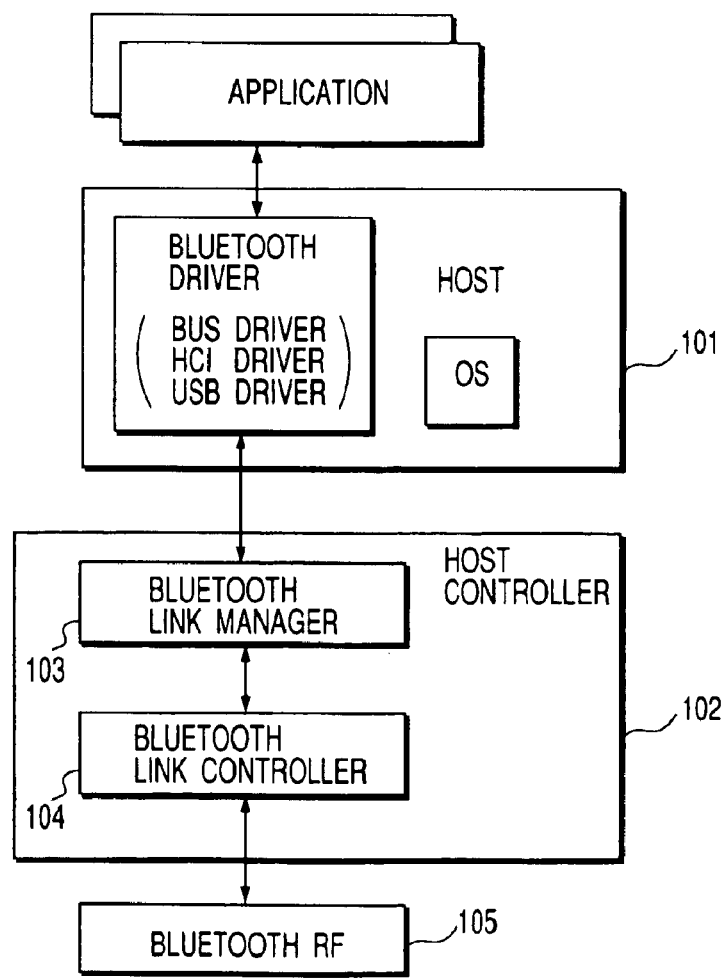
FIG. 7 is a block diagram showing the arrangements of a host and host controller which are applied to the personal computer in the system according to the embodiment.

FIG. 7 shows the arrangement of the PC 1 incorporating the Bluetooth system. An OS, Bluetooth bus driver, and application are resident on the memory of the PC 1 (host side), and the Bluetooth device itself (host controller side) is connected as, for example, a USB device. A host 101 and host controller 102 communicate with each other in accordance with an HCI (Host Controller Interface). The host controller 102 includes a link manager 103 and link controller 104. The operation of an RF circuit 105 is controlled by the link manager 103 and link controller 104.

To execute Inquiry, the host 101 transmits an HCI command to the host controller 102. An Inquiry command may be singly transmitted every time an application is to perform communication, or Inquiry may be periodically performed. When Inquiry is to be periodically performed, two parameters, Max_Period_Length and Min_Period_Length, used to determine the time intervals of Inquiry in an HCI command are set. The host controller 102 determines an arbitrary value in the range between the designated maximum value of Max_Period_Length and the designated minimum value of Min_Period_Length. Inquiry is performed every time interval corresponding to the determined value.

Max_Period_Length is defined to have a range of 3.84 sec to 83884.8 sec. Min_Period_Length is defined to have a range of 2.56 sec to 83883.52 sec. In executing Inquiry Scan and Page Scan as well, the HCI command is transmitted to the host controller 102. In such a case, a parameter termed InquiryScan_Interval/PageScan_Interval for designating the time interval of Inquiry Scan/Page Scan must be set. InquiryScan_Interval/PageScan_Interval has a range of 11.25 ms to 2560 ms and a default value of 1.28 sec.

The link controller 104 has two major states, namely a standby state and connection state. The connection state includes four modes, namely an active mode, sniff mode, hold mode, and park mode. The sniff mode, hold mode, and park mode are power saving modes. If ACL connections are present in performing Inquiry, Inquiry Scan, or Page Scan, these ACL connections must be temporarily shifted to the park mode or hold mode, which is a power saving mode of a connection state to ensure an available slot for Inquiry, Inquiry Scan, or Page Scan. That is, data communication is temporarily stopped.

As is obvious from the above description of the Bluetooth specifications, a great loss is caused in terms of performance and power consumption if the time intervals of Inquiry, Inquiry Scan, and Page Scan remain unchanged. A feature of this embodiment is that such time intervals are optimized in accordance with the state of a device and the state of connection.

Figure 8:
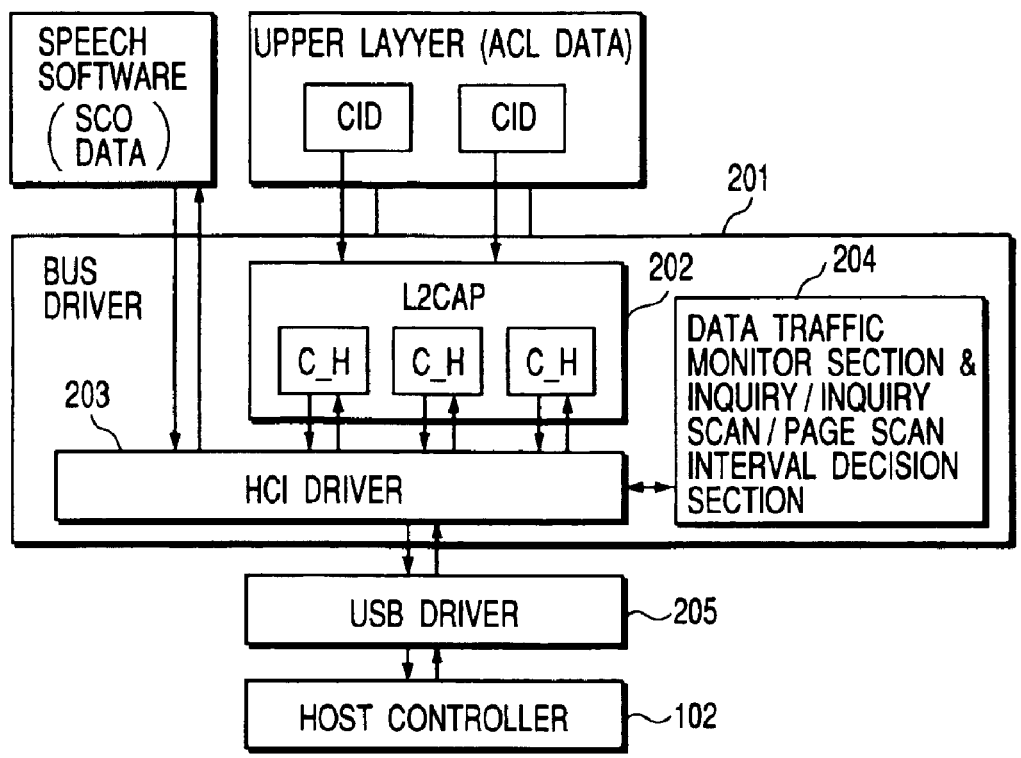
FIG. 8 is a block diagram showing an arrangement around a bus driver on the host side in FIG. 7.

The bus driver converts data from an upper protocol driver into Bluetooth data and controls a Bluetooth link. FIG. 8 shows the arrangement of drivers and the flow of ACL/SCO data.

An upper layer which is an upper protocol driver of a bus driver 201 establishes ACL connection for each CID (logical channel ID). In the bus driver 201, an L2CAP (Logical Link Control and Adaptation Protocol) 202 establishes connection for each Connection_Handle (CH) which is a physical channel identifier. An HCI driver 203 communicates HCI data packets to a USB driver 205, which serves to control the host controller 102, by using one transmission port and one reception port.

The bus driver 201 can therefore have communication traffic information, e.g., information indicating how many active ACL and SCO connections are currently established, a specific packet type used by each connection, and a specific speed of data transmission request from the upper layer. Since the HCI driver 203 can systematically monitor traffics, control can be performed in accordance with the traffic state of a current communication channel by using a data traffic monitor section & Inquiry/Inquiry Scan/Page Scan interval decision section 204.

Assume that no slot is available because of the establishment of a plurality of links, and a requested speed from the upper layer is high. In this case, the time interval of Inquiry Scan is set to be long, and Inquiry is not performed unless an application requests connection establishment. In addition, if no link is present, the time intervals of Inquiry Scan and Page Scan are minimized to allow Inquiry Scan and Page Scan to be performed most frequently or Inquiry is periodically performed to acquire information about terminals within the communication zone in advance.

By determining the timings and time intervals of Inquiry, Inquiry Scan, and Page Scan in accordance with the data traffic amount in this manner, the use of the radio communication resource is optimized, and the communication performance can be improved.

Figure 9:
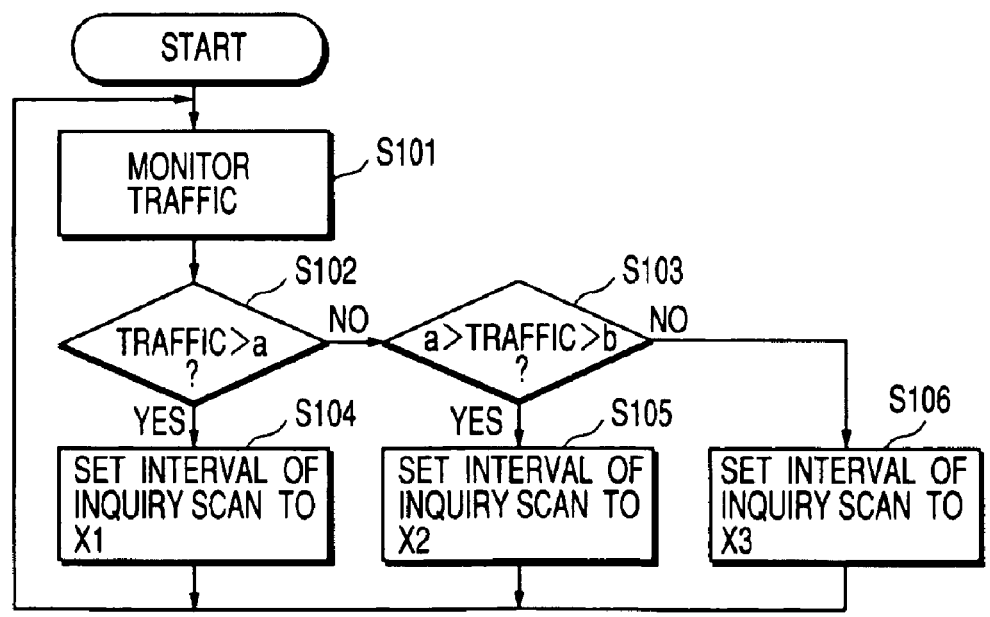
FIG. 9 is a flow chart showing a procedure for optimization control processing for a traffic amount, which is executed in the system according to the embodiment.

The flow chart of FIG. 9 shows an example of Inquiry Scan Optimization Control Processing.

First of all, a data traffic is monitored (step S101). It is then checked whether the current traffic amount exceeds a predetermined threshold a, falls within the range of the threshold a to a threshold b (b<a), or is equal to or less than the threshold b (steps S102 and S103). If the traffic amount exceeds the threshold a (YES in step S102), the time interval of Inquiry Scan is set to a maximum value X1 to prevent communication performance from deteriorating due to Inquiry Scan (step S104). Likewise, if the traffic amount falls within the range of the threshold a to the threshold b (YES in step S103), the time interval of Inquiry Scan is set to an intermediate value X2 (step S105). If the traffic amount is equal to or less than the threshold b (NO in step S103), the time interval of Inquiry Scan is set to a minimum value X3 (step S106). In this case, X1>X2>X3.

Figures 10, 11, 12:
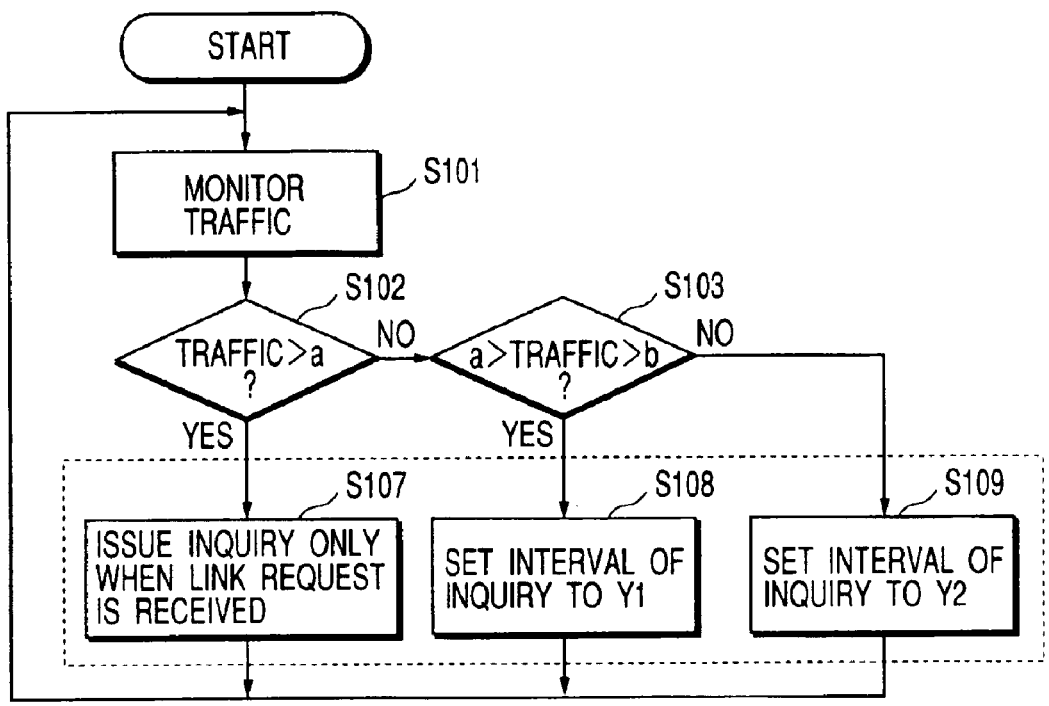
FIG. 10 is a flow chart showing a second procedure for optimization control processing for a traffic amount, which is executed in the system according to the embodiment.
FIG. 11 is a view showing an example of a user interface window used in the system according to the embodiment.
FIG. 12 is a view showing another example of the user interface window used in the system according to the embodiment.

The flow chart of FIG. 10 shows an example of Inquiry optimization control processing.

First of all, a data traffic is monitored (step S101). It is then checked whether the current traffic amount exceeds the predetermined threshold a, falls within the range of the threshold a to the threshold b (b<a), or is equal to or less than the threshold b (steps S102 and S103). If the traffic amount exceeds the threshold a (YES in step S102), the current mode is changed to a mode of stopping periodical transmission of Inquiry and issuing Inquiry only when an application or user requests the establishment of a new radio link in order to prevent communication performance from deteriorating due to Inquiry (step S107). If the traffic amount falls within the range of the threshold a to the threshold b (YES in step S103), the time interval of Inquiry is set to a predetermined value Y1 to periodically execute Inquiry (step S108). If the traffic amount is equal to or less than the threshold b (NO in step S103), the time interval of Inquiry is set to a minimum value Y2 (step S109). In this case, Y1>Y2.

The control in FIG. 9 or 10 can be applied to Page Scan as well. In practice, various traffic states, e.g., whether current communication demands high communication performance and influences of a halt on current communication, are detected as well as the communication traffic amount, and appropriate control is executed in accordance with the detected states.

(Second Example of Optimization of Parameters for Connection Control)

The second example of optimization control processing of this embodiment will be described next. In the above case, optimization control is performed on the basis of a traffic state. In some case, the performance improves when control is performed in accordance with a user's use pattern. Assume that communication between PCs 1 or between the PC 1 and a PDA is to be started. In this case, if the user manually stops transmission by an application and performs Inquiry Scan and Page Scan instead of automatic execution of Inquiry Scan and Page Scan, a waste of the resource can be prevented. That is, the user or application can explicitly output an Inquiry Scan or Page Scan execution instruction. A specific example how such control becomes effective will be described.

Consider an application that performs communication upon establishing an ad hoc network by establishing a plurality of connections. In this case, a terminal that wants to join this network afterward must establish connection by performing Inquiry or Page with respect to the master of a piconet. In such an application model, the master should use available slots for Inquiry Scan and Page Scan as long as possible. The master of the piconet, however, serves as a server in this network. If many transmission requests are generated by the upper layer during communication with a plurality of slaves, a data overflow may occur in the bus driver 201, and the frequencies of execution of Inquiry Scan and Page Scan are suppressed. This may make it difficult for the terminal to join the network. That is, the operability of this application is poor.

Such a problem is prevented as follows. When the user designates the execution of Inquiry Scan/Page Scan, the application temporarily stops communication if data is being transmitted, and communicates with the bus driver 201 to instruct the execution of Inquiry Scan/Page Scan. By temporarily stopping the communication of the application, no overflow of transmission data occurs in the bus driver 201 even if data communication through a Bluetooth link is stopped for Inquiry Scan/Page Scan. FIG. 11 shows a user interface window for an ad hoc network application.

A member join button is prepared on this window. Assume that a given terminal is to join the network. In this case, the user presses this member join button on an application on a terminal serving as a master in a piconet in the network. At the same time, the application temporarily stops data transmission at a proper timing to allow execution of Inquiry Scan/Pate Scan, or informs the lower bus driver 201 of the presence of a terminal that has established connection. As indicted by the flow in FIG. 7, the instruction is transmitted to the host controller 102, and the bus driver 201 transmits the HCI command to the host controller 102, thus instructing periodical execution of Inquiry Scan/Page Scan. If ACL connections are present, the host controller 102 shifts them to the park mode or hold mode and starts Inquiry Scan/Page Scan to quickly establish connection. The host controller 102 then restores the ACL connections, which have been shifted to the power saving mode, to the active state to resume data communication.

By setting the timing and time interval of Inquiry Scan/Page Scan in accordance with an explicit instruction from the user, a deterioration in communication performance which is not intended by the user can be prevented. In addition, since control suitable for the operation of an application is performed, the overall performance of the system improves.

Figure 13:
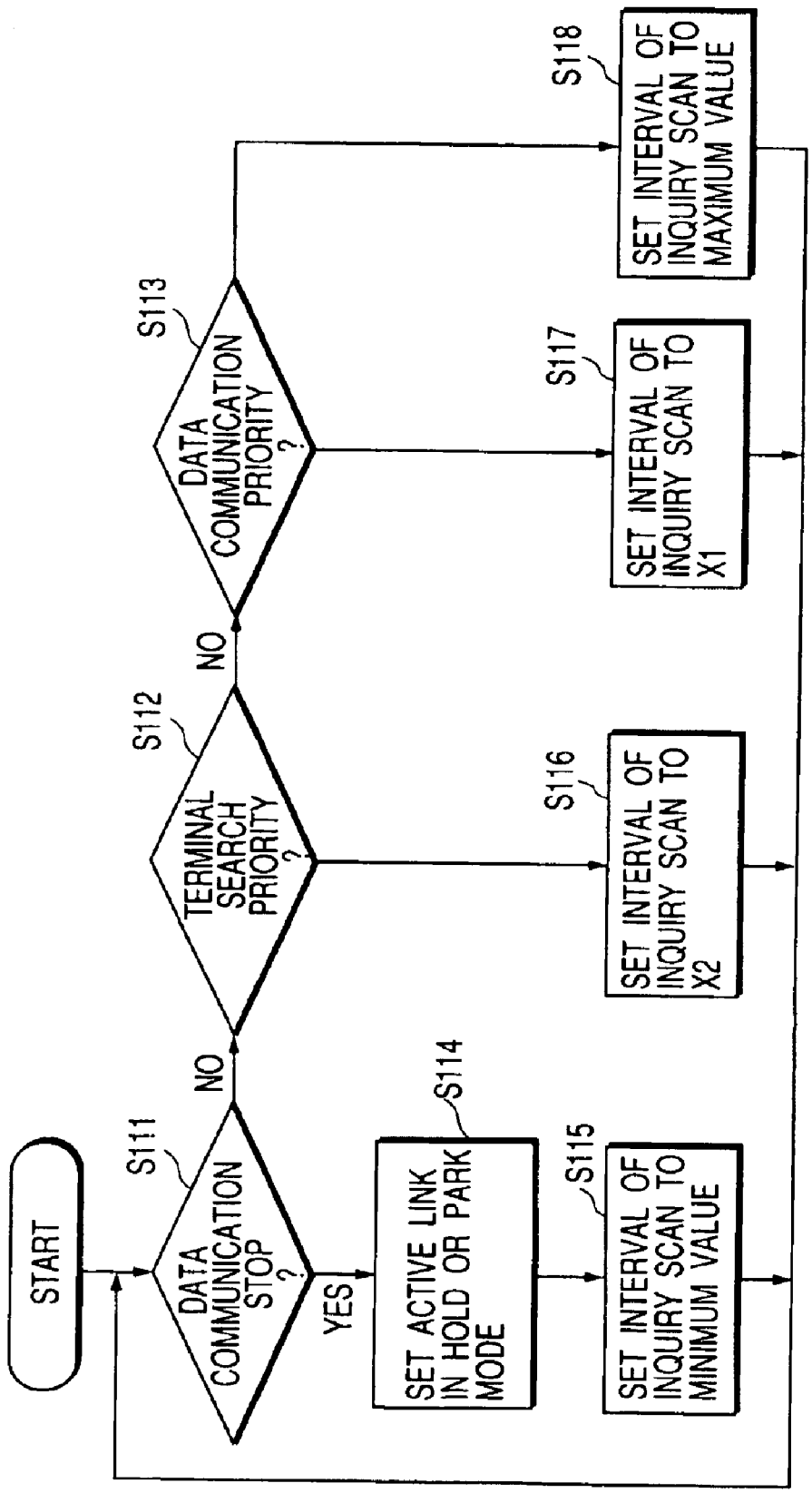
FIG. 13 is a flow chart showing a procedure for optimization control processing corresponding to a user set mode, which is executed in the system according to the embodiment.

In addition, a terminal serving as a master is preferably made to preferentially execute either radio link establishment processing or data communication processing in accordance with a user operation by using a user interface window like the one shown in FIG. 12. If "data communication stop" or "terminal search priority" in FIG. 12 is selected, radio link establishment processing is preferentially performed. If "data communication priority" or "no terminal search" is selected, data communication processing is preferentially performed. A detailed control procedure will be described below with reference to the flow chart of FIG. 13.

First of all, the mode selected by the user is "data communication stop", "terminal search priority", "data communication priority", or "no terminal search" (steps S111 to S113). If "data communication stop" is selected (YES in step S111), the currently active link is set in the hold or park mode to temporarily stop communication (step S114). The time interval of Inquiry Scan is then set to the minimum value to quickly respond to a terminal search message (step S115). If "terminal search priority" is selected (YES in step S112), the time interval of Inquiry Scan is set to X2 (X2>minimum value) to relatively quickly respond to a terminal search message (step S116).

If "data communication priority" is selected (YES in step S113), the time interval of Inquiry Scan is set to the relatively large value X1 (X1>X2) to minimize the chance of interruption of data communication under execution (step S117). If "no terminal search" is selected (NO in step S113), the time interval of Inquiry Scan is set to the maximum value to exclusively use the radio communication resource for data communication (step S118).

With regard to the terminal that issues Inquiry, the time interval of Inquiry is variably controlled in accordance with the mode selected by the user. The time interval of Page Scan is also variably controlled by the same procedure as described above.

(Third Example of Optimization of Parameters for Connection Control)

The third example of the optimization control processing of this embodiment will be described next. In this example, it is discriminated whether the PC 1 is driven on an external AC power supply or built-in battery. If the PC 1 is driven by the battery, the time interval of Inquiry Scan/Page Scan is set to be long, or Inquiry is issued only when a link request is received, thereby performing control for power saving. In addition, when the PC 1 is driven by the battery, control is also performed to prolong the time interval as the battery residual capacity decreases.

Figure 14:
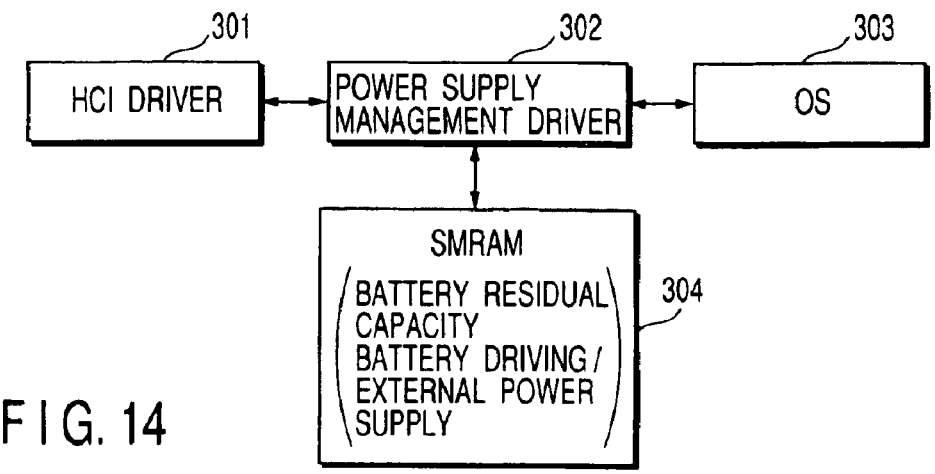
FIG. 14 is a block diagram for explaining the principle of power supply information acquisition processing in the system according to the embodiment.

A case wherein the bus driver 201 directly checks a battery residual capacity will be described first. FIG. 14 shows the power supply management software of this embodiment. Information associated with a battery, e.g., the residual capacity of the battery and information indicating whether the PC 1 is driven by the battery or external AC power supply, is managed in a system management memory (SMRAM) 304 under the control of a power supply management driver 302. An OS 303 and HCI driver 301 in the bus driver 201 have interfaces with the power supply management driver 302, and can check the current power supply state through the power supply management driver 302.

Assume that a capacity ratio (%) is to be calculated as a battery residual capacity. If the PC 1 is driven by the battery, the bus driver 201 reads out the capacity of the battery that was previously fully charged and the current capacity from the system management memory 304, and calculates a residual capacity C.

C=current residual capacity/capacity of battery fully charged previously

InquiryScan_Interval/PageScan_Interval can be set in increments of 0.625 ms according to the specifications. The time interval of Inquiry Scan/Page Scan is calculated by 0.625×N. The default value of N is 2048, and the range of N is $18 \leq N \leq 4096$.

An equation that shortens the time interval of Inquiry Scan/Page Scan as C increases, and vice versa is exemplified below.

$$\text{InquiryScan\_Interval} = 0.625 \times 2048 \times 1/C$$

If, however, $C \leq 0.5$, $$\text{InquiryScan\_Interval} = 2.56$$

If the battery residual capacity is 100%, the default value is 1.28 sec. If the battery residual capacity is 50% or less, the default value is 2.56 sec. The value calculated by such an equation is set as a parameter, and the HCI driver transmits the HCI command to the host controller 102. Either the HCI driver 301 in FIG. 15 or the power supply management driver 302 can have a calculation means.

In addition, information indicating that the battery driving mode and external power supply driving mode are switched is preferably registered in the OS 303 to allows acquisition of the information as an event. When these modes are switched, the OS 303 preferably informs the bus driver 201 of the information indicating the switching of the modes.

Figure 15:
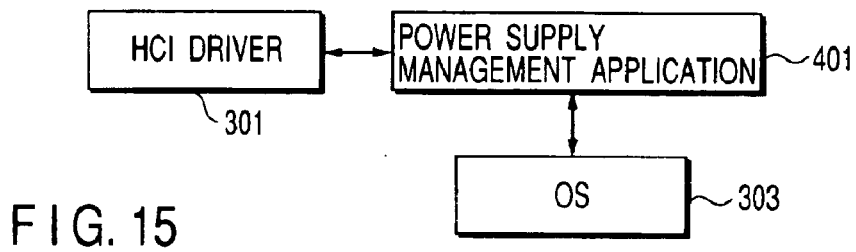
FIG. 15 is a block diagram for explaining another example of the power supply information acquisition processing in the system according to the embodiment.

Instead of a direct check on a power supply state by the bus driver 201, an application program 401 for performing Bluetooth power supply control may be prepared as shown in FIG. 15, and the application program 401 may inquire the OS 303 about external power supply driving/battery driving and battery residual capacity in accordance with a request from the HCI driver 301 of the bus driver 201.

Figure 16:
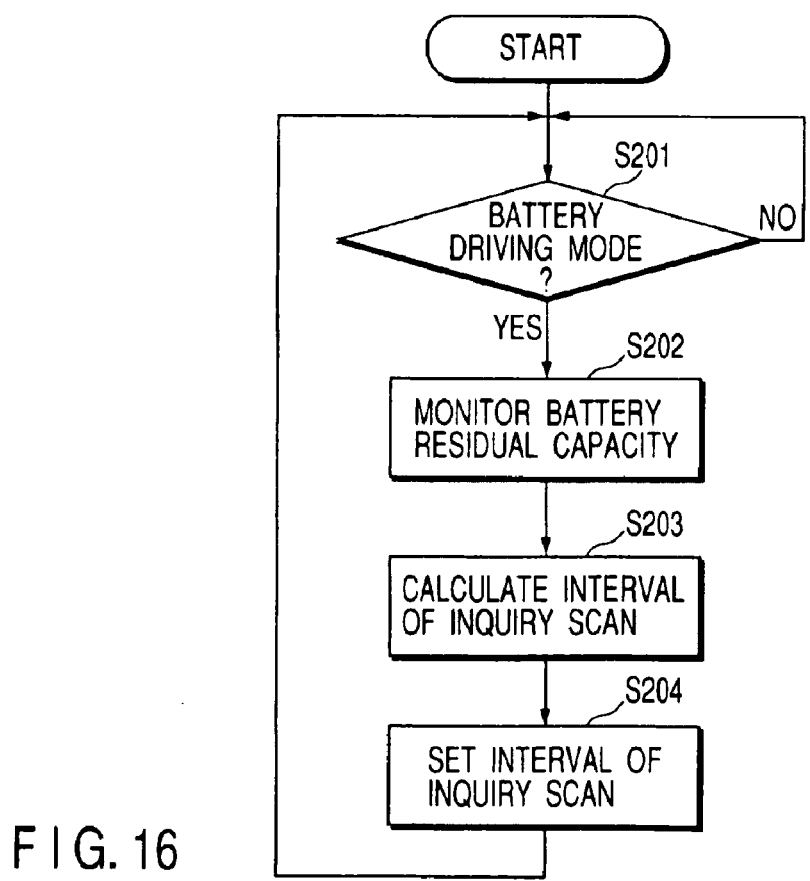
FIG. 16 is a flow chart showing a procedure for optimization control processing corresponding to a power supply state, which is executed in the system according to the embodiment.

A procedure for performing optimization control processing in accordance with a power supply state will be described next with reference to the flow chart of FIG. 16. Inquiry Scan will be exemplified.

First of all, whether the current operating power supply is the battery or external AC power supply is determined by checking whether the external AC power supply is connected (step S201). If the external AC power supply is connected and the PC 1 is driven by the external AC power supply, the default value is used as the time interval of Inquiry Scan.

If no external AC power supply is connected and the PC 1 is driven by the battery (YES in step S201), the current battery residual capacity is checked (step S202). The time interval of Inquiry Scan is calculated from the battery residual capacity such that the time interval of Inquiry Scan prolongs with a decrease in battery residual capacity, and the time interval of Inquiry Scan is set to the calculated value (steps S203 and S204).

A similar procedure can be applied to Inquiry/Page Scan. In addition, Inquiry may be set to a mode of stopping periodical transmission when the battery residual capacity decreases below a predetermined value, and performing transmission only when a link request is received. The mode of performing transmission only when such a request is received can be applied to Inquiry Scan/Page Scan.

As described above, according to this embodiment, parameters for connection control can be optimized by dynamically controlling the execution timings and time intervals of Inquiry, Inquiry Scan, and Page Scan in accordance with a traffic state, user settings, and power supply state. This eliminates a waste of power and implements both an improvement in communication performance and connectability.

In this embodiment, parameter optimization control has been described above with particular emphasis on the PC 1. However, similar control can be applied to the portable telephone 2. In addition to PCs and portable telephones, the present invention can be applied to various electronic devices as long as they have communication apparatuses in which the radio communication resource is exclusively used between a communication channel and a control channel, and connection control is performed by inserting the control channel in the communication channel.

In this embodiment, control operations based on a traffic state, power supply state, and user settings have been separately described. However, a combination of these control operations can also be used. If, for example, the traffic is large, the time interval of connection control may be prolonged even in the AC power supply driving mode. In contrast to this, if the traffic is small, the time interval of connection control may be shortened even in the battery driving mode. In this manner, the time interval of connection control can be variously set in accordance with user settings.

As has been described in detail above, according to the present invention, parameters associated with connection control, e.g., the time interval of a terminal search and the time interval of terminal search wait processing, can be dynamically optimized, and hence an improvement in communication performance and suppression of power consumption can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus in which a communication channel and a control channel are exclusively assigned to a radio communication resource to be used, said apparatus comprising:

means for executing data transmission/reception using the communication channel;

means for periodically executing an inquiry scan;

user interface means for setting preferentiality related to one of the data transmission/reception and the inquiry scan in accordance with a user operation; and means for controlling an execution time interval of the inquiry scan on the basis of a setting result of said user interface means.

2. The apparatus according to claim 1, wherein said user interface means sets one of a first mode of preferentially executing the data transmission/reception and a second mode of preferentially executing the inquiry scan, and said controlling means controls the execution time interval of the inquiry scan in accordance with a mode set by said user interface means.

3. A communication apparatus capable of being driven by a battery and simultaneously connecting to a plurality of remote terminals, said apparatus comprising:

means for executing transmission processing of a terminal search message for searching for a remote terminal or terminal search wait processing for detecting a terminal search message for searching for a remote terminal and responding thereto;

means for detecting a residual capacity of the battery; and means for dynamically controlling an execution timing or executing time interval of the transmission processing of the terminal search message or the terminal search wait processing on the basis of a detection result of said detection means.

4. The apparatus according to claim 3, further comprising:

means for determining whether a current operating power supply is the battery or an external power supply; and means for dynamically controlling the execution timing or execution time interval of the transmission processing of the terminal search message or the terminal search wait processing on the basis of a determination result of said determining means.

5. The apparatus according to claim 4, wherein the time interval is prolonged with a decrease of the residual capacity of the battery when the current operating power supply is the battery, and the time interval is set to a default value when the current operating power supply is the external power supply.

6. A control method for a communication apparatus in which a communication channel and a control channel are exclusively assigned to a radio communication resource to be used, said method comprising the steps of:

executing data transmission/reception using the communication channel and periodically executing an inquiry scan;

setting preferentiality related to one of the data transmission/reception and the inquiry scan in accordance with a user operation; and controlling an execution time interval of the inquiry scan on the basis of a setting result in said setting step.

7. The method according to claim 6, further comprising the steps of:

setting one of a first mode of preferentially executing the data transmission/reception and a second mode of preferentially executing the inquiry scan: and controlling the execution time interval of the inquiry scan in accordance with a mode set in said setting step.

8. A control method for a communication apparatus capable of being driven by a battery and simultaneously connecting to a plurality of remote terminals, said method comprising the steps of:

detecting a residual capacity of the battery; and dynamically controlling an execution timing or execution time interval of transmission processing of a terminal search message for searching for a remote terminal or terminal search wait processing for detecting a terminal search message for searching for a remote terminal and responding thereto on the basis of a detection result in said detecting step.

9. The method according to claim 8, further comprising the steps of:

determining whether a current operating power supply is the battery or an external power supply; and dynamically controlling the execution timing or execution time interval of the transmission processing of the terminal search message or the terminal search wait processing on the basis of a determination result in said determining step.

10. The method according to claim 9, wherein the time interval is prolonged with a decrease of the residual capacity of the battery when the current operating power supply is the battery, and the time interval is set to a default value when the current operating power supply is the external power supply.

* * * * *